UNITED STATES PATENT OFFICE.

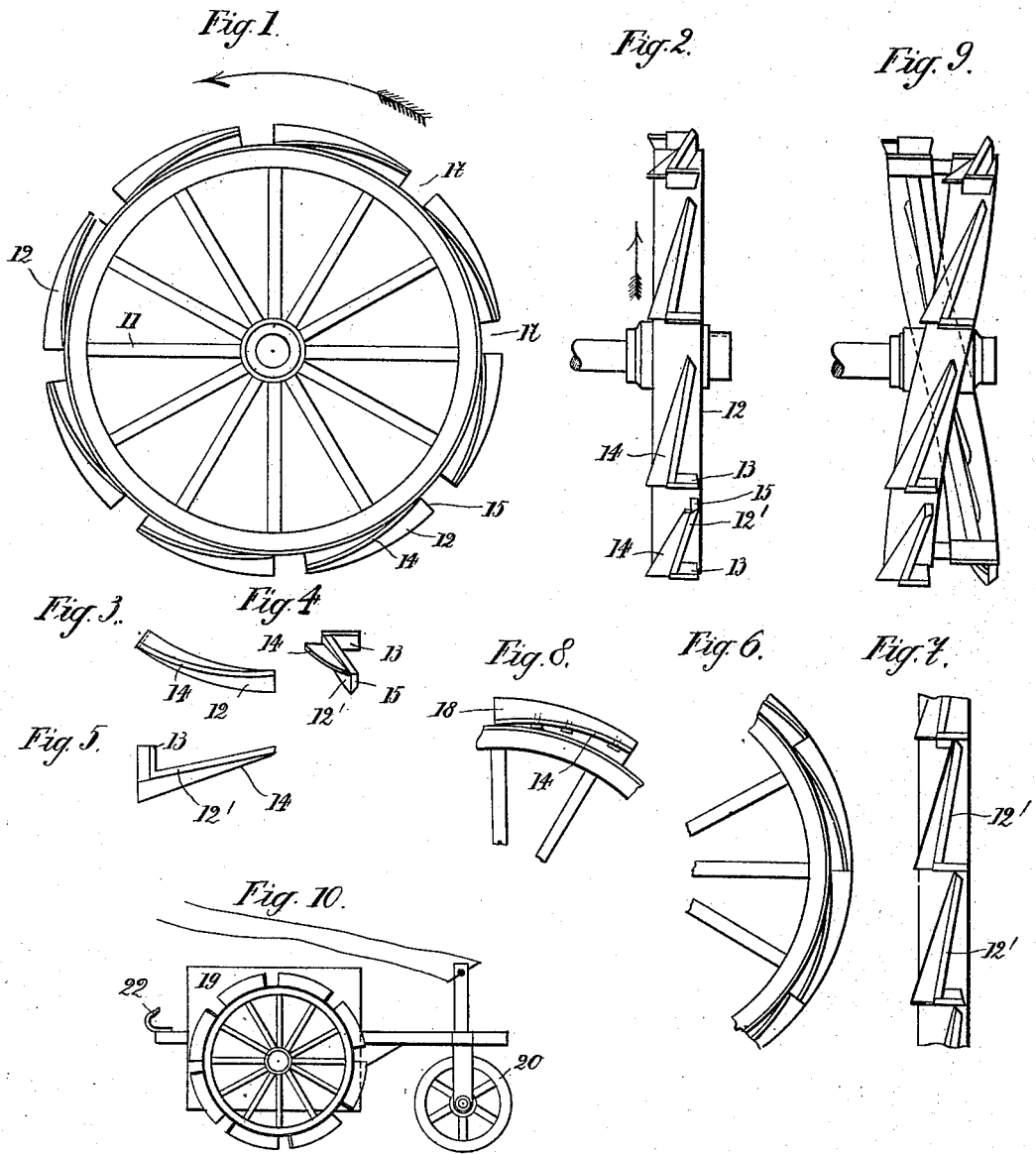

EDWARD BONIECKI, OF KOUZMINCY, RUSSIA.

DRIVING-WHEEL FOR TRACTION-MOTORS.

SPECIFICATION forming part of Letters Patent No. 722,278, dated March 10, 1903.

Application filed July 11, 1902. Serial No. 115,194. (No model.)

*To all whom it may concern:*

Be it known that I, EDWARD BONIECKI, residing at Kouzmincy, Governement Padol, Russia, have invented certain new and useful Improvements in Driving-Wheels for Traction-Motors; and I do hereby declare the following to be a full, clear, and exact description of the invention, such as will enable others skilled in the art to which it appertains to make and use the same.

The new driving-wheel with greater rim resistance is intended for use with traction-motors—i. e., motors applied to carriage traction, loaded vans, agricultural implements, &c.—on ordinary roads.

Heretofore driving-wheels in which greater rim resistance was required have, as a rule, been provided with grooves or transversely-arranged projections, but many of them have not answered the purposes very well on very soft, muddy, and slippery, as well as on hard stony roads. In most cases the wheels simply revolved without effect. In those cases a driving-wheel with still greater rim resistance is wanted, and this constitutes the purpose of the present invention, as will be fully described farther on.

My invention is intended to overcome the described disadvantages; and the invention consists in the novel construction, arrangement, and combination of parts hereinafter fully described, illustrated in the drawings, and pointed out in the appended claims.

In the accompanying drawings, Figure 1 is an elevation of my new driving-wheel; Fig. 2, an edge view. Fig. 3 is a side view of one of the resistance-plates secured to the rim of the wheel; Fig. 4, a side view looking from the right of Fig. 3; Fig. 5, a view from above of Fig. 3. Figs. 6 and 7 show a different disposition of the resistance-plates on the rim of the wheel. Fig. 8 shows a method of affixing rubber pieces on the guard-ribs of the plates for the purpose of forming a continuous rubber tire. Fig. 9 shows one of the possible modifications of the form of the new wheel, and Fig. 10 is a diagrammatic view of the traction-motor.

On the rim of a wheel 11 are secured edgewise resistance-plates 12 of the form shown in Figs. 3, 4, and 5. Each plate consists, first, of a sufficiently thick diagonally-arranged part 12', which is affixed to the rim in any convenient way. For instance, in the example shown in the drawings the plates are kept in position by means of bolts let in from the inside of the rim; secondly, of a part 13, directed transversely to the rim at an acute angle to the first part, and, thirdly, of a bent arched rib 14, whose purpose is explained later.

The exterior (front) edge of the diagonally-directed part 12' is so cut that its left side as viewed in Fig. 2—i. e., the side facing the direction in which the plate is moving during the normal revolution of the wheel—is higher than the right. In the same manner is cut the transverse part 13, so that the edge of its side facing the direction in which the wheel is moving—i. e., the higher-situated edges in Fig. 2—are higher, or, in other words, farther from the center of the wheel than the other edges of those sides.

The ends 15 of parts 12 are cut radially in regard to the rim, forming a flat surface, as shown in the lowest plate of Fig. 2 and in Fig. 4.

Each plate 12 is provided on the side facing the direction of its motion with a guard-rib 14, bent in the form of an arc, but secured eccentrically in regard of the wheel. These ribs are called "guard-ribs," because when the wheel is moving and the plates 12 are sinking consecutively into the soft ground they cannot sink deeper than the guard-ribs, and the wheel is lifted up to the surface of the ground by means of the ribs after the passage of every plate, which is easily understood from the lower part of Fig. 1. For very heavy traction-motors these guard-ribs can be replaced by solid wedge-like metallic pieces, which should in thickness extend to the edge of the rim and whose outer surface should correspond to the outer (front) surface of the ribs shown in the drawings.

The size of the plates 12 13 and of the intervals 17, (between the plates on the rim of the wheel,) as well as the breadth, (and, as mentioned above, the thickness,) of the guard-ribs 14, are all variable and quite optional. The intervals 17 are made larger if it is desired that the wheel should sink deeply into the ground with the ends 15 of its plates. For example, in Figs. 6 and 7 is shown the disposition of the plates 12 on the rim of the wheel meant chiefly for very hard roads or ground, in which there are no intervals 17—that is to say, each succeeding plate begins where the preceding plate ends. This wheel is easily converted into one with rubber tires by affixing, as shown in Fig. 8, to the ribs 14 pieces of rubber 18 of convenient form.

The frictional rim resistance of the wheel can be still further increased by giving the wheel a divided shape—for example, dividing it into two parts, as represented in Fig. 9—or more than two parts can also be shaped corresponding to the blades of a ship-screw. The friction is then enormously increased, owing to the side pressure of the wheel on the ground during its revolution.

The improved wheels can be equally well applied to traction-motors, acting on the wheel-axle or only on one wheel directly or indirectly, by means of a suitable gearing arrangement.

Fig. 10 represents a diagrammatic view of a traction-motor provided with the improved wheel. The motor 19 of the engine is placed between the wheels. 20 represents the front steering-wheel, and 22 represents a hook by means of which the carriage or the load is coupled to the traction-motor.

What I claim, and desire to secure by Letters Patent, is—

1. The combination with the rim of a wheel, of plates each comprising a section extending diagonally of the rim, a section extending transversely to the rim and a guard-section arranged eccentrically to the rim.

2. The combination with the rim of a wheel, of plates each comprising a section extending diagonally of the rim, and having its edge facing the direction in which the wheel is revolved higher than the opposite edge, a section extending transversely to the rim and having its edge facing the direction of movement of the wheel higher than the opposite edge, and an arched section extending eccentrically to the rim.

3. The combination with the rim of a wheel made in two sections each having a twisted shape, as described, of plates each comprising a section extending diagonally of a rim-section, a section extending transversely to the rim and a guard-section arranged eccentrically to the rim-section.

4. The combination with the rim of a wheel, of plates each comprising a section extending diagonally of the rim, a section extending transversely to the rim and a guard-section arranged eccentrically to the rim, the said guard-section having a wedge or tapering shape, as set forth.

In testimony whereof I have affixed my signature in presence of two witnesses.

EDWARD BONIECKI. [L. S.]

Witnesses:
STANISLAUS PRAKSEGUEN,
JUNIUS H. BANDAUS.